United States Patent [19]

Iimura et al.

[11] Patent Number: 5,102,973

[45] Date of Patent: Apr. 7, 1992

[54] CONJUGATED SYSTEM-CONTAINING ORGANIC HIGH MOLECULAR COMPOUND

[75] Inventors: Kazuyoshi Iimura, 1-20 Koyodai 1-chome, Iruma-shi, Saitama; Seiji Ujiie, Kurinhaitsu 103, 1-153, Midorigaoka, Matsudo-shi, Chiba; Mitsutaka Miyabayashi, Mie, all of Japan

[73] Assignees: Mitsubishi Petrochemical Co., Ltd., Tokyo; Kazuyoshi Iimura, Iruma; Seiji Ujiie, Matsudo, all of Japan

[21] Appl. No.: 593,739

[22] Filed: Oct. 5, 1990

[30] Foreign Application Priority Data

Oct. 13, 1989 [JP] Japan .................................. 1-264999
Oct. 13, 1989 [JP] Japan .................................. 1-265000

[51] Int. Cl.$^5$ ........................................... C08G 63/44
[52] U.S. Cl. .................................. 528/176; 528/184; 528/190; 528/192; 528/196; 528/230; 528/272; 528/288; 528/291; 528/292; 528/306; 528/308; 528/332; 528/335; 528/369; 528/370
[58] Field of Search ............... 528/176, 184, 190, 192, 528/196, 230, 272, 288, 291, 292, 306, 308, 332, 335, 369, 370

[56] References Cited

U.S. PATENT DOCUMENTS

| | | | |
|---|---|---|---|
| 4,439,015 | 3/1984 | Rich et al. ..................... | 350/350 R |
| 4,526,704 | 7/1985 | Petrzilka et al. ................ | 252/299.61 |
| 4,624,872 | 11/1986 | Stuetz ........................... | 428/1 |
| 4,744,918 | 5/1988 | Heppke et al. .................. | 252/299.61 |
| 4,786,709 | 11/1988 | Iimura et al. ................... | 528/298 |
| 5,041,369 | 8/1991 | Fukui et al. .................... | 430/619 |

OTHER PUBLICATIONS

Patent Abstracts of Japan, vol. 12, No. 103 (C-485)(2950), 5th Apr. 1988, p. 98 C 485; and JP-A-62 232 409 (Mitsubishi Petrochem Co. Ltd) 12-11-1987.

*Primary Examiner*—John Kight, III
*Assistant Examiner*—Sam A. Acquah

*Attorney, Agent, or Firm*—Oblon, Spivak, McClelland, Maier & Neustadt

[57] ABSTRACT

A conjugated system-containing organic high molecular compound is described, which contains a recurring unit represented by the following structural formula (I) and has a number-average molecular weight of 1,000 or more:

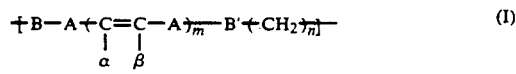

wherein m represents an integer of from 2 to 10; n represents an integer of from 1 to 23; B and B' respectively represent —NHCO— and —CONH—, —CONH— and —NHCO—,

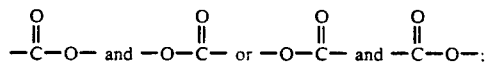

—A— is selected from the group consisting of

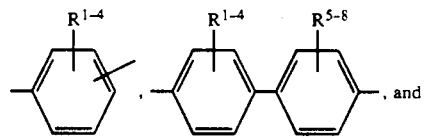
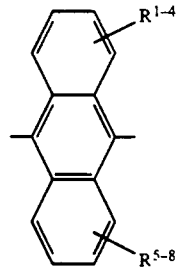

wherein $R^{1-4}$ and $R^{5-8}$ each independently is selected from the group consisting of a hydrogen atom, a halogen atom, an alkyl group having 1 to 5 carbon atoms, an amino group, an alkylamino group having 1 to 5 carbon atoms, a hydroxyl group, an alkoxyl group having 1 to 5 carbon atoms, a cyano group, a nitro group, and groups of the following formulae (a), (b), and (c), provided that the groups of —A— may be the same or different:

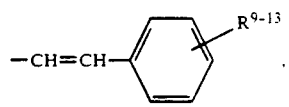
(a)

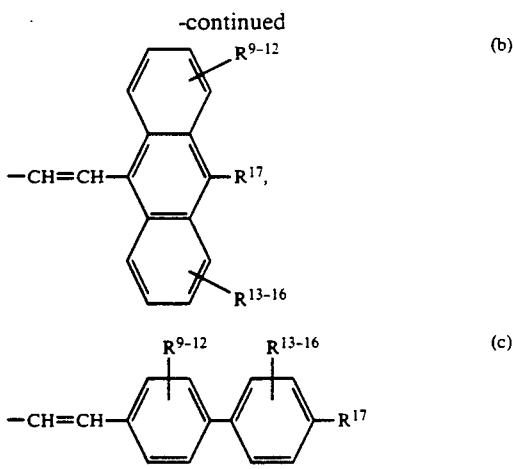
(b)

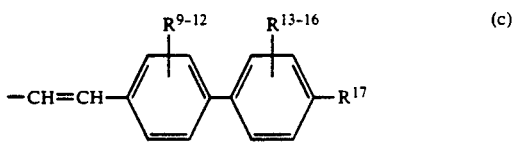
(c)

wherein $R^{9-12}$, $R^{13-16}$, and $R^{17}$ each independently is selected from the group consisting of a hydrogen atom, a halogen atom, an alkyl group having 1 to 5 carbon atoms, an amino group, an alkylamino group having 1 to 5 carbon atoms, a hydroxyl group, an alkoxyl group having 1 to 5 carbon atoms, an aldehyde group, a carboxyl group, a cyano group, and a nitro group; and $\alpha$ and $\beta$ each independently is selected from the group consisting of a hydrogen atom, a cyano group, and a nitro group.

5 Claims, 2 Drawing Sheets

CONJUGATED SYSTEM-CONTAINING ORGANIC HIGH MOLECULAR COMPOUND

FIELD OF THE INVENTION

The present invention relates to an organic high molecular compound which is a novel compound containing a conjugated system and is useful as a photofunctional material or a high molecular liquid-crystal substance.

BACKGROUND OF THE INVENTION

In recent years, conjugated system-containing organic high molecular compounds have been actively developed and studied, and new findings concerning such compounds have been obtained. For example, it has been found that the electrical conductivity of conjugated system-containing organic high molecular compounds, e.g., polyacetylene, is greatly improved by doping the compounds with a dopant such as $AsF_5$, $I_2$, etc. [Phys. Rev. Letters, Vol. 39, 1098 (1977)], and that conjugated system-containing organic high molecular compounds such as polyacetylene are made to be n-type or p-type semiconductors by doping the compounds with electron-donative or electron-acceptive compounds [Applied Phys. Letters 33 18 (1978)].

In addition, since $\pi$-electrons of conjugated system-containing high molecular compounds such as polydiacetylene show nonlinear response to the electric field of an intense light such as a laser beam, use of such compounds as nonlinear optical materials is attracting attention. Conjugated system-containing high molecular compounds such as polypyrrole and polythiophene are made to change in color by doping suitable compounds thereto and, hence, applications of such high molecular compounds to optical switches are being attempted [Kōgyō Zairyō 31 (No. 10) 69 (1983)].

Such conjugated system-containing organic high molecular compounds, which thus have the possibility of being used in new applications, are expected to possess further new functions.

U.S. Pat. No. 4,786,709 proposes organic high molecular liquid crystals having specific structures.

SUMMARY OF THE INVENTION

The present inventors have made intensive studies of organic high molecular compounds. As a result, it has now been found that by incorporating a specific conjugated system into the recurring units in a polymer backbone, a useful conjugated system-containing organic high molecular compound can be obtained to which luminescent properties such as fluorescent properties have been imparted and which shows a liquid-crystal behavior in a proper temperature range. Based on this finding, the present invention has been completed.

It is, therefore, an object of the present invention to provide a novel organic high molecular compound containing a conjugated system in the backbone thereof.

The conjugated system-containing organic high molecular compound of the present invention contains a recurring unit represented by the following structural formula (I) and has a number-average molecular weight of 1,000 or more:

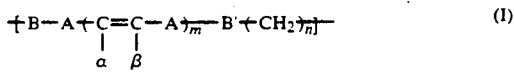

wherein m represents an integer of from 2 to 10; n represents an integer of from 1 to 23; B and B' respectively represent —NHCO— and —CONH—, —CONH— and —NHCO—,

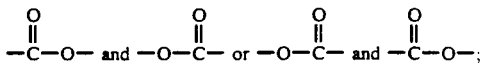

—A— is selected from the group consisting of

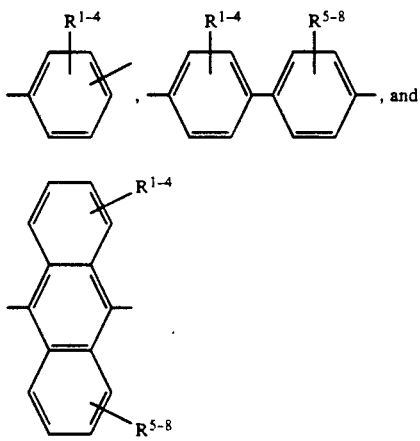

wherein $R^{1-4}$ and $R^{5-8}$ each independently is selected from the group consisting of a hydrogen atom, a halogen atom, an alkyl group having 1 to 5 carbon atoms, an amino group, an alkylamino group having 1 to 5 carbon atoms, a hydroxyl group, an alkoxyl group having 1 to 5 carbon atoms, a cyano group, a nitro group, and groups of the following formulae (a), (b), and (c), provided that the groups of —A— may be the same or different:

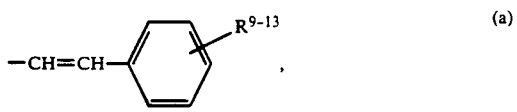

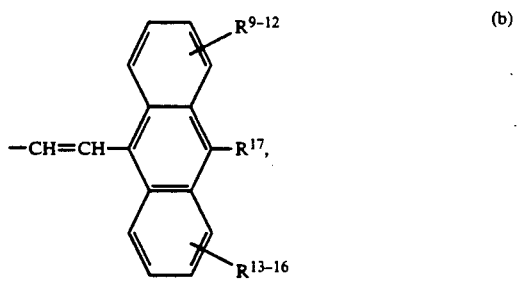

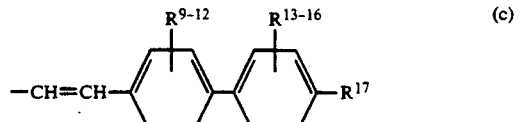

wherein $R^{9-12}$, $R^{13-16}$, and $R^{17}$ each independently is selected from the group consisting of a hydrogen atom, a halogen atom, an alkyl group having 1 to 5 carbon atoms, an amino group, an alkylamino group having 1 to 5 carbon atoms, a hydroxyl group, an alkoxyl group having 1 to 5 carbon atoms, an aldehyde group, a carboxyl group, a cyano group, and a nitro group; and $\alpha$ and $\beta$ each independently is selected from the group consisting of a hydrogen atom, a cyano group, and a nitro group.

DETAILED DESCRIPTION OF THE INVENTION

Figure 1:
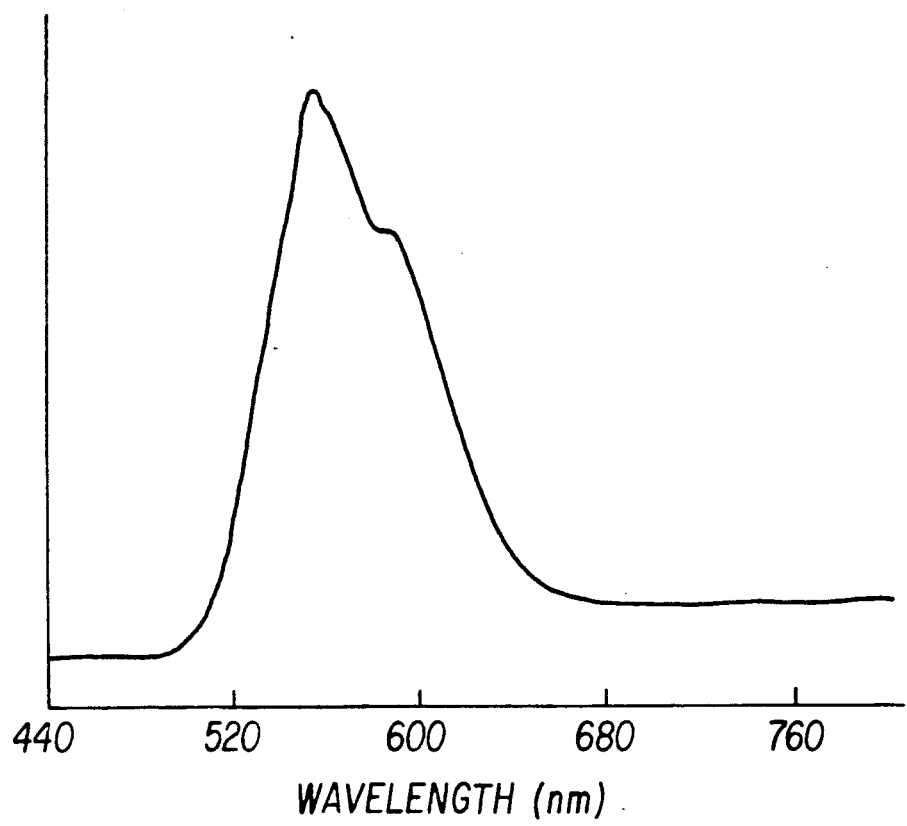
FIG. 1 is a diagram of the fluorescence spectrum of the compound obtained in Example 1 according to the present invention.

The conjugated system-containing organic high molecular compound represented by formula (I) given above includes compounds represented by the following structural formulae (I-1) to (I-4):

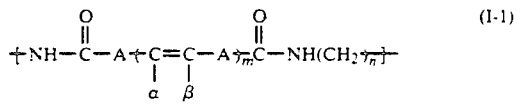

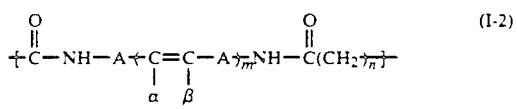

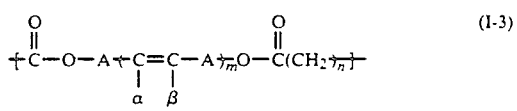

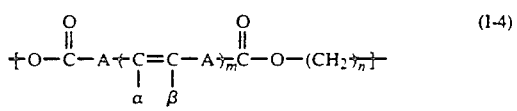

wherein m, n, A, $\alpha$, and $\beta$ are as defined above.

Symbol m in formulae (I-1) to (I-4) above indicates the length of the conjugated system, and is suitably selected so as to obtain a desired luminescence spectrum such as fluorescence spectrum. For example, larger m numbers are preferable from the standpoint of imparting a particular function such as the property of showing photoconductivity upon exposure to light with a relatively long wavelength range, while smaller m numbers are preferable from the standpoint of easy synthesis. The m value also affects the liquid crystal-forming behavior of the compound. Thus, functions to be utilized, easiness of the synthesis of the compound, and other factors are taken into account when selecting a suitable m number. Generally, however, m is preferably an integer of from 2 to 4, more preferably 2 or 3, most preferably 2.

Symbol n in the above formulae indicates the length of the spacer in the molecule, and influences the thermal transition behavior, mechanical properties, and other properties of the polymer. For example, n affects the behavior of the polymer when it undergoes phase transition to form a liquid crystal. Generally, n is preferably an integer of from 2 to 14, more preferably from 4 to 12, even more preferably from 6 to 10, and most preferably 8.

In place of the moiety of $+CH_2+_n$, use may be made of a branched alkylene chain obtained by replacing part of the hydrogen atoms in the moiety with an alkyl group R ($+CHR+_n$: R is an alkyl group having 1 to 12, preferably 1 to 5, more preferably 1 to 3, carbon atoms, with the most preferred R being a methyl group).

In formulae (I-1) to (I-4) given above, $\alpha$ and $\beta$ each preferably is a hydrogen atom or a cyano group, and it is more preferable that either $\alpha$ is a cyano group and $\beta$ is a hydrogen atom or $\alpha$ is a hydrogen atom and $\beta$ is a cyano group.

In formulae (I-1) to (I-4) above, —A— is any of the groups represented by the following formulae.

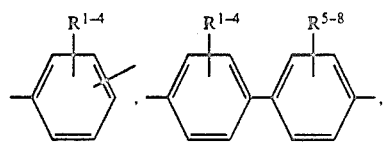

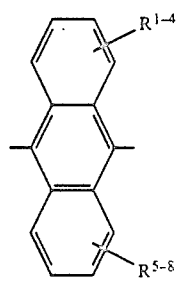

In the recurring unit represented by each of the formulae, the groups of —A— may be the same or different.

The group represented by the formula

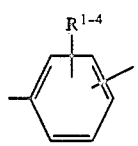

may be of any of the following three structures respectively linked to the adjacent groups at the para, meta, and ortho positions.

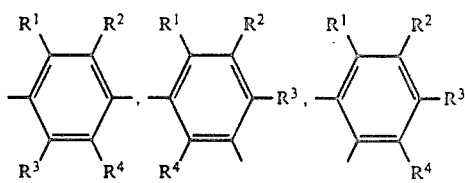

However, the para-linked structure is preferred from the standpoints of the degree of the conjugation of electrons in the conjugated system and the ability of forming liquid crystal.

$R^{1-4}$ and $R^{5-8}$ each preferably is selected from the group consisting of a hydrogen atom, an alkyl group having 1 to 3 carbon atoms, a halogen atom, and groups represented by the following formulae (a), (b), and (c).

(a) 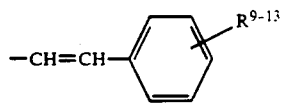

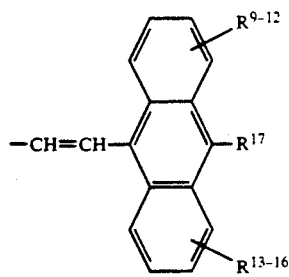

(c) 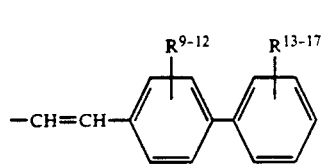

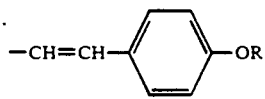

(where R is a hydrogen atom or an alkyl group having 1 to 3 carbon atoms)

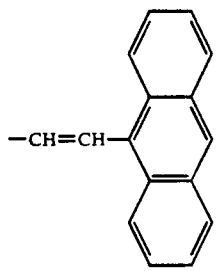

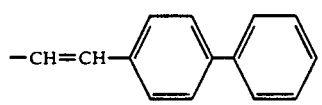

In the above formulae (a), (b), and (c), $R^{9-13}$, $R^{9-12}$, $R^{13-16}$, and $R^{17}$ each preferably is selected from the group consisting of a hydrogen atom, a halogen atom, an alkyl group having 1 to 3 carbon atoms, a cyano group, a nitro group, an amino group, an alkylamino group having 1 to 3 carbon atoms, and an alkoxyl group having 1 to 3 carbon atoms, and more preferably is selected from the group consisting of a hydrogen atom, a halogen atom, a methyl group, a cyano group, and a nitro group.

Preferred examples of the groups represented by the above formulae (a), (b), and (c) are as follows.

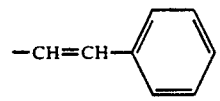

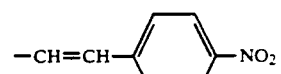

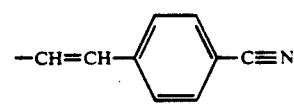

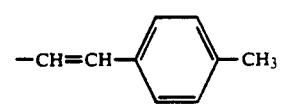

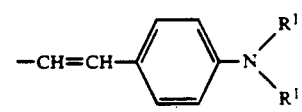

(where $R^1$ and $R^2$ each is a hydrogen atom or an alkyl group having 1 to 3 carbon atoms)

Preferred examples of the moiety represented by

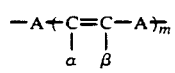

in each of structural formulae (I-1) to (I-4) include the following (I) to (XIII).

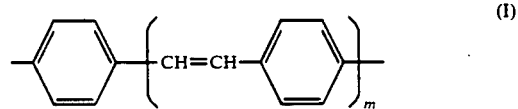

(m = 2, 3, or 4)

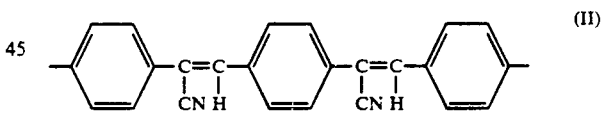

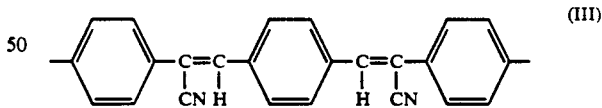

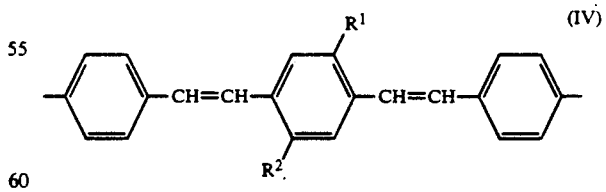

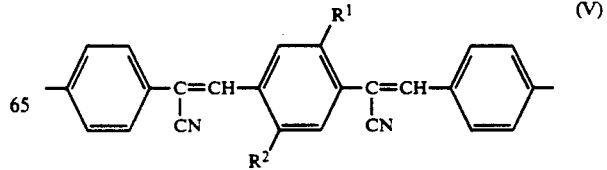

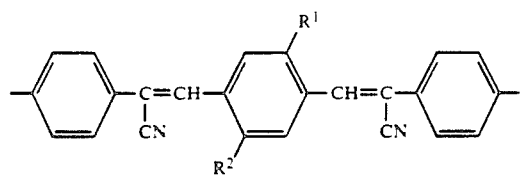 (VI)

(In the above (IV), (V), and (VI), R¹ and R² each is selected from the group consisting of a hydrogen atom, a halogen atom, a methyl group,

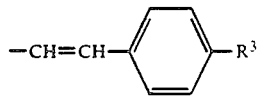

(where $R^3$ is a hydrogen, a cyano group, or a methyl group), and

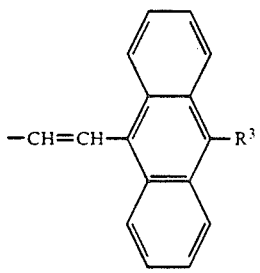

(where $R^3$ is as defined above), provided that at least one of $R^1$ and $R^2$ is not a hydrogen atom.)

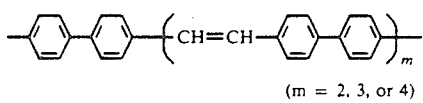 (VII)

(m = 2, 3, or 4)

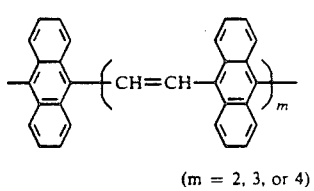 (VIII)

(m = 2, 3, or 4)

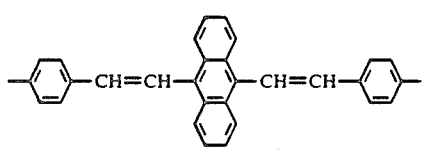 (IX)

(X)

(XI)

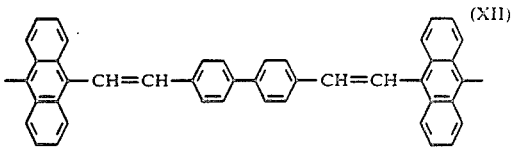 (XII)

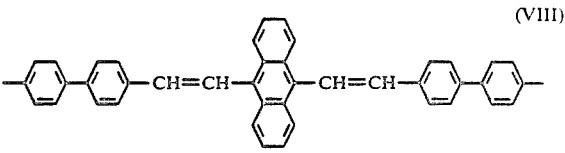 (VIII)

Of these, (I), (II), (III), (IV), (V), and (VI) are more preferred and (II), (III), (V), and (VI) are even more preferred, with the most preferred examples being (II) and (III).

In the recurring units represented by structural formulae (I-1) to (I-4) given above, the average content ($C_t$) of trans-form carbon-carbon double bonds in all the carbon-carbon double bonds affects the thermal phase-transition behavior, mechanical properties, and other properties of the conjugated system-containing organic high molecular compound of this invention. In order to obtain desired properties, $C_t$ is preferably 60% or higher, more preferably 80% or higher.

The conjugated system-containing organic high molecular compound of the present invention has a number-average molecular weight of 1,000 or more. However, the molecular weight is normally from 1,000 to 100,000, preferably from 2,000 to 100,000, more preferably from 3,000 to 100,000, even more preferably from 4,000 to 50,000, and most preferably from 5,000 to 30,000.

From the standpoints of the property of emitting a fluorescence in a longer wavelength region and the property of showing photoconductivity upon exposure to light in a longer wavelength region, it is preferable that the conjugated system-containing organic high molecular compound of this invention contain recurring units shown by the above-described structural formula (I-2) or (I-3).

The conjugated system-containing organic high molecular compound of the invention which contains a recurring unit shown by structural formula (I-2) described above can be produced, for example, as follows.

In one method, a diamine compound of the formula

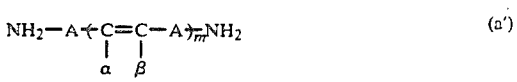 (a')

(where m, A, α, and β are as defined above) and a dicarboxylic acid compound of the formula

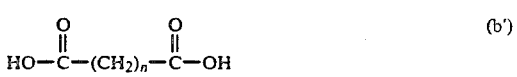 (b')

(where n is as defined above) are subjected to polycondensation, thereby yielding the desired polyamide.

In place of compound (b') above, a compound of the formula

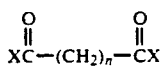 (c')

(where X is a halogen atom such as Cl, and n is as defined above) may be used likewise to conduct polycondensation with a diamine compound of the above formula (a'), thereby synthesizing the desired polyamide.

Alternatively, the desired polyamide may be synthesized by the ring-opening polymerization of a cyclic lactam shown by the following formula.

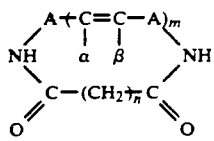

On the other hand, the organic high molecular compound containing a recurring unit shown by structural formula (I-1) given above can be produced by methods similar to those described above.

That is, a dicarboxylic acid compound of the formula

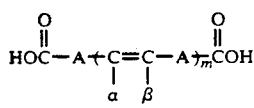 (d)

(where m, A, α, and β are as defined above) and a diamine compound of the formula

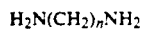 (e)

(where n is as defined above) are subjected to polycondensation, thereby yielding the desired polyamide.

In place of compound (d) above, a compound of the formula

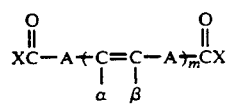 (f)

(where X is a halogen atom, and m, A, α, and β are as defined above) may likewise be used along with a diamine compound of the above formula (e) to synthesize the desired polyamide.

Alternatively, the desired polyamide may be synthesized by the ring-opening polymerization of a cyclic lactam shown by the following formula.

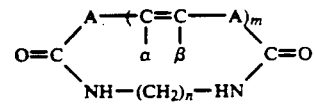

The organic high molecular compound containing a recurring unit shown by structural formula (I-3) described above can be synthesized by a method in which a diol compound of the formula

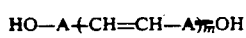 (g)

(where m and A are as defined above) and a dicarboxylic acid compound of the formula

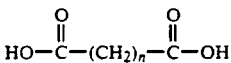 (h)

(where n is as defined above) are directly subjected to ordinary esterification reaction, or it may be synthesized by the ester interchange reaction of an ester compound of the formula

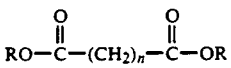 (i)

(where R is an alkyl group normally having 1 or 2 carbon atoms, and n is as defined above) with a diol compound of the above formula (g).

Further, the organic high molecular compound containing a recurring unit shown by structural formula (I-4) given above can be produced by methods similar to those described just above.

That is, a dicarboxylic acid compound of the formula

 (j)

(where m and A are as defined above) and a diol compound of the formula

HO(CH$_2$)$_n$OH  (k)

(where n is as defined above) are directly subjected to ordinary esterification reaction, thereby to synthesize the desired compound. Alternatively, the organic high molecular compound containing a recurring unit of formula (I-4) may be synthesized by the ester interchange reaction of an ester compound of the formula

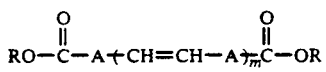 (l)

(where R, m, and A are as defined above) with a diol compound of the above formula (k).

It is also possible to synthesize the organic high molecular compounds containing recurring units of structural formula (I-1) to (I-4) by other known synthesis methods for polyamides or polyesters (Polycondensation, Kōza Jūgō Hannō Ron, Vol. 9, written by Naoya Ogata, published by Kagaku Dojin, Japan).

In performing the above polymerizations, a molten-state polycondensation process may be employed in which the reaction mixture is heated to a temperature not lower than the melting points of the monomers and of the polymer to be produced, and polycondensation reaction is carried out in a liquid-phase uniform system. According to need, a solid-phase polycondensation process may be used.

Furthermore, an interfacial polycondensation process may be used in which, for example, a carboxylic acid compound of the structural formula (b'), (d), (h), or (j) is converted into an acid chloride or chloroformate and then dissolved in an organic solvent, a diamine compound of the structural formula (a') or (e) or a diol compound of structural formula (g) or (k) is dissolved in water, and the organic solvent solution derived from compound of the structural formula (b'), (d), (h), or (j) is brought into contact with the aqueous solution of compound of the structural formula (a'), (e), (g), or (k), respectively, thereby synthesizing a polyamide or polyester at the interface between the solutions.

A solution polycondensation process may also be employed in which polymerization is performed in a solvent for the monomers and polymer.

The compound formed by the polycondensation can be added with a catalytic amount of iodine and can be then further reacted at 0° to 100° C., preferably 10° to 80° C. for 1 minute to 60 hours, preferably 5 minutes to 10 hours, thereby allowing the compound to undergo trans isomerization. Thus, a conjugated system-containing organic high molecular compound of this invention can be obtained which has a desired $C_t$ value.

Since the novel conjugated system-containing organic high molecular compound of the present invention has a long conjugated system in the backbone thereof and the actually effective length of the conjugated system is controllable, the compound possesses the property of emitting light, such as "fluorescence", which may be attributable to the energy level of the specific structure of the conjugated system.

The organic high molecular compound of this invention can be made to further possess a thermotropic liquid-crystal behavior, i.e., the property of exhibiting an intermediate phase in a temperature range of from the solid-to-intermediate (solid-to-liquid crystalline) phase transition temperature to the intermediate-to-isotropic fluid phase transition temperature, by suitably selecting the structure of the mesogenic group (the moiety contributing liquid-crystal formation), the length of the methylene segment, etc.

Owing to these characteristic properties, the conjugated system-containing organic high molecular compound of the present invention can be utilized in a variety of fields. For example, it can be utilized in a display taking advantage of the property of absorbing exciting light and emitting a "fluorescence" or "phosphorescence". Applications utilizing the liquid crystal function include a fluorescence-scattering liquid-crystal element in which focal conic structures of the high molecular compound of this invention are used as light-scattering centers to effectively draw fluorescence from the liquid-crystal element, and further include a luminous liquid-crystal element in which the orientation of liquid-crystal groups is controlled by means of an electric or magnetic field.

Further, use of the high molecular compound of the present invention as an electroluminescent material is expected in which an electrical voltage is applied to the high molecular compound or a composite material comprising the high molecular compound and a dielectric substance such as cyanoethyl cellulose to cause a luminescence.

Furthermore, the high molecular compound of the present invention can be used, owing to the thermooptical properties, as a recording (thermorecording) material or a display material of the thermoaddress type.

A transparent film of the high molecular compound of this invention in which the molecules have been oriented homeotropically is irradiated with a laser beam to heat the irradiated portion and allow the portion to pass into an isotropic liquid phase and then the irradiated portion is cooled rapidly to form a polydomain structure, thereby allowing the film to memorize or retain the change in light-scattering state. Thus, recording of information or writing of images can be performed. The written information or images can be erased by heating the high molecular compound film to allow the film to pass into an isotropic liquid phase again, and then gradually cooling the film as it is or with application of an electric or magnetic filed to form transparent homeotropic textures.

The above-described recording of information or writing of images can also be conducted by use of heating electrodes in place of a laser.

In particular, since the high molecular compound of this invention has an absorption spectrum (color tone) ascribable to the specific conjugated system contained in the backbone and also is excellent in the property of being orientated, information recording and image writing can be performed with good contrast by using the high molecular compound of this invention. The compound of this invention can also be applied to a polarizing film, taking advantage of the above properties.

The high molecular compound of the present invention can further be used for applications as a high-efficiency electrooptical material, since the compound contains delocalized $\pi$ electrons in the conjugated system in the backbone thereof and the conjugated systems in the molecules can be orientated in one direction to a high degree.

Moreover, the high molecular compound of this invention can be utilized as a photoconductive material.

The present invention is explained in more detail by reference to the following Examples, which should not be construed to be limiting the scope of the invention.

EXAMPLE 1

In 30 ml of ethanol were dissolved 5 g of potassium hydroxide and 12 g of p-aminobenzyl cyanide. Subsequently, a solution obtained by dissolving 5 g of terephthalaldehyde in 30 ml of ethanol was added dropwise to the above solution and reaction was allowed to proceed at $-5°$ C. for 3 hours. The resulting precipitate was filtered off, washed thoroughly with cold ethanol and water, and then dried with suction, thereby obtaining the compound of the following formula.

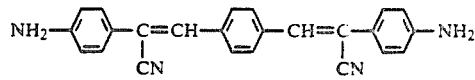

In 20 ml of water were dissolved 3 g of the above-obtained compound and 0.663 g of sodium hydroxide. To this aqueous solution were added a solution obtained by dissolving 1.98 g of sebacic acid chloride in 20 ml of o-dichlorobenzene and 0.01 g of triethylbenzylammonium chloride. This mixture was stirred vigorously at room temperature for 1 hour to allow a reaction to proceed. The resulting reaction mixture was poured into 500 ml of methanol, and then a high molecular polycondensate was filtered off, washed with methanol by means of a Soxhlet's extractor, and then dried with suction.

Upon elementary analysis, IR spectroscopy, etc., the product obtained above was ascertained to be a polymer containing the recurring unit of the following formula.

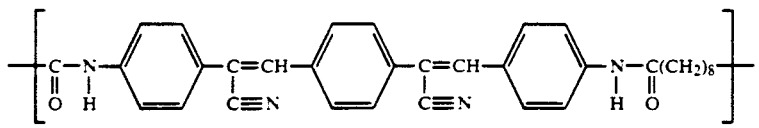

The fluorescence spectrum of this polymer is shown in FIG. 1.

As seen from FIG. 1, this polymer according to the present invention has the function of emitting a fluorescence having a peak around 570 nm.

EXAMPLE 2

In 50 ml of ethanol were dissolved 5 g of potassium hydroxide and 5 g of terephthalaldehyde. Subsequently, 12 g of p-methoxybenzyl cyanide was added dropwise to the above solution and reaction was allowed to proceed at room temperature for 3 hours. The resulting precipitate was filtered off, washed thoroughly with water, subsequently recrystallized from methanol, and then dried with suction. Thus, a compound of the formula

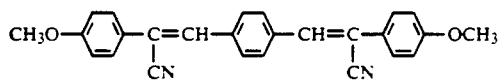

was obtained.

In 200 ml of acetic acid was dissolved 10 g of the above-obtained compound. Subsequently, 70 ml of hydrobromic acid was added dropwise to the solution and reaction was allowed to proceed at 110° C. for 9 hours. The resulting precipitate was filtered off and washed thoroughly with water to obtain a compound of the following formula.

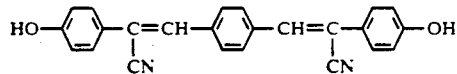

In 20 ml of water were dissolved 3 g of the above-obtained compound and 0.65 g of sodium hydroxide. To this aqueous solution were added a solution obtained by dissolving 1.94 g of sebacic acid chloride in 20 ml of o-dichlorobenzene and 0.01 g of triethylbenzylammonium chloride. This mixture was stirred vigorously at room temperature for 1 hour to allow a reaction to proceed. The resulting reaction mixture was poured into 500 ml of methanol, and then a high molecular polycondensate was filtered off, washed with methanol by means of a Soxhlet's extractor, and then dried with suction.

Upon elementary analysis, IR spectroscopy, etc., the product obtained above was ascertained to be a polymer containing the recurring unit of the following formula.

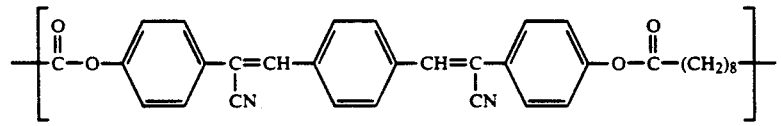

This polymer showed an intermediate phase at temperatures not lower than 250° C., but the transition temperature at which the polymer passed from the intermediate phase into an isotropic phase could not be measured because this transition temperature was close to the decomposition temperature of the polymer.

Figure 2:
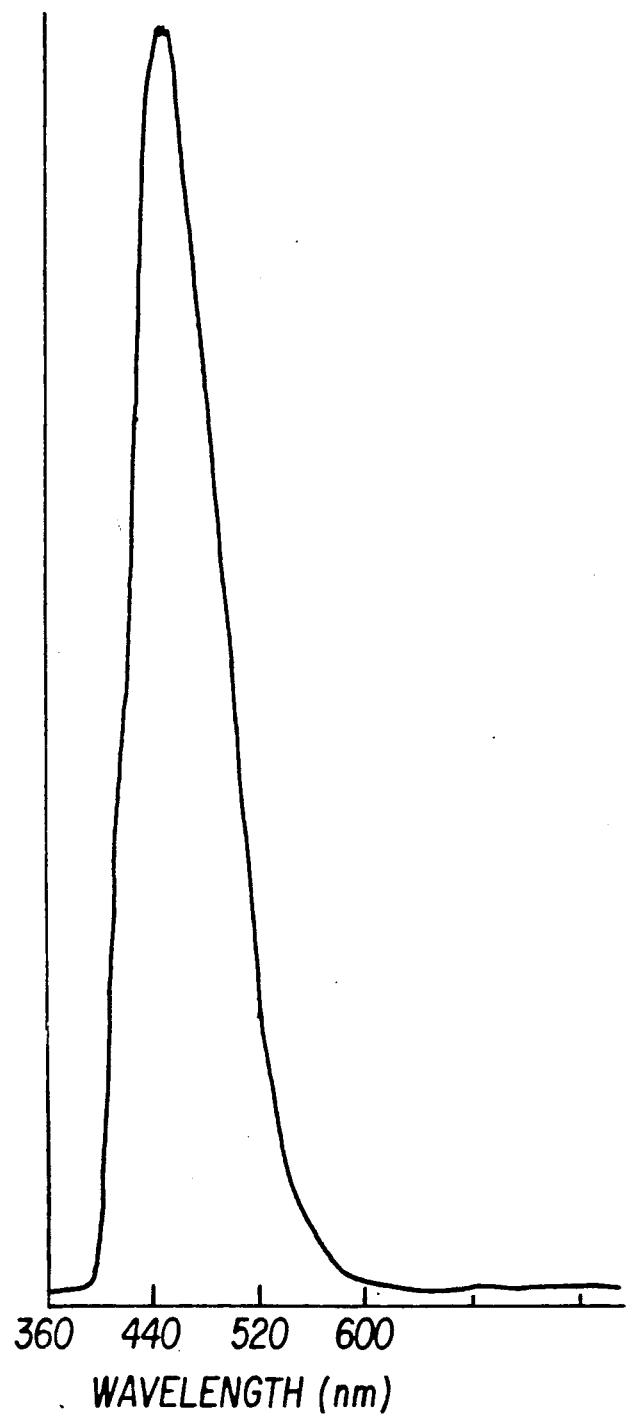
FIG. 2 is a diagram of the fluorescence spectrum of the compound obtained in Example 2 according to the present invention.

The fluorescence spectrum of this polymer is shown in FIG. 2.

As seen from the above and FIG. 2, this polymer according to the present invention has a liquid-crystal behavior and also the property of emitting a fluorescence having a peak around 470 nm.

While the invention has been described in detail and with reference to specific embodiments thereof, it will be apparent to one skilled in the art that various changes and modifications can be made therein without departing from the spirit and scope thereof.

What is claimed is:

1. A conjugated system-containing organic high molecular compound which contains a recurring unit represented by the following structural formula (I) and has a number-average molecular weight of 1,000 or more:

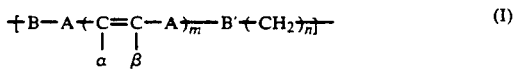

wherein m represents an integer of from 2 to 10; n represents an integer of from 1 to 23; B and B' respectively represent —NHCO— and —CONH—, —CONH— and —NHCO—,

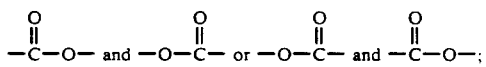

—A— is selected from the group consisting of

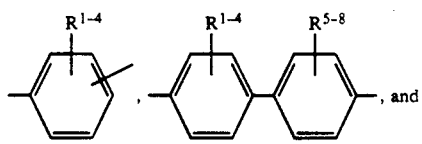

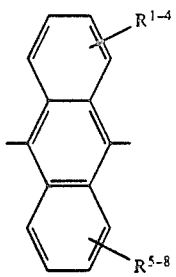

wherein $R^{1-4}$ and $R^{5-8}$ each independently is selected from the group consisting of a hydrogen atom, a halogen atom, an alkyl group having 1 to 5 carbon atoms, an amino group, an alkylamino group having 1 to 5 carbon atoms, a hydroxyl group, an alkoxyl group having 1 to 5 carbon atoms, a cyano group, a nitro group, and groups of the following formulae (a), (b), and (c), provided that the groups of —A— may be the same or different:

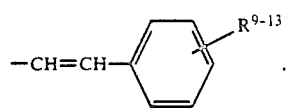 (a)

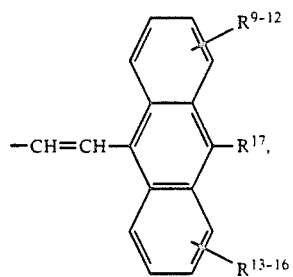 (b)

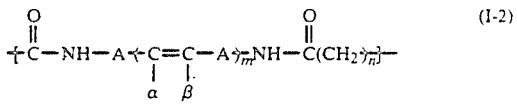 (c)

wherein and $R^{9-12}$, $R^{13-16}$, and $R^{17}$ each independently is selected from the group consisting of a hydrogen atom, a halogen atom, an alkyl group having 1 to 5 carbon atoms, an amino group, an alkylamino group having 1 to 5 carbon atoms, a hydroxyl group, an alkoxyl group having 1 to 5 carbon atoms, an aldehyde group, a carboxyl group, a cyano group, and a nitro group; and $\alpha$ and $\beta$ each independently is selected from the group consisting of a hydrogen atom, a cyano group, and a nitro group.

2. A conjugated system-containing organic high molecular compound as claimed in claim 1, wherein the recurring unit is represented by the following structural formula (I-2):

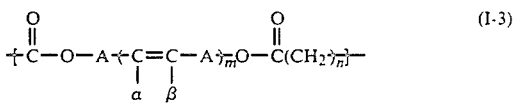 (I-2)

wherein m, n, —A—, $\alpha$, and $\beta$ are as defined in claim 1.

3. A conjugated system-containing organic high molecular compound as claimed in claim 1, wherein the recurring unit is represented by the following structural formula (I-3):

$$\begin{array}{c}\text{(I-3)}\\ \underset{\alpha\ \ \beta}{-\!\!\left(\!\!\begin{array}{c}O\\\|\\C\end{array}\!\!-\!O\!-\!A\!\!\left(\!\!\begin{array}{c}\\C\!=\!C\\|\ \ |\end{array}\!\!-\!A\!\right)_{\!\!m}\!\!O\!-\!\begin{array}{c}O\\\|\\C\end{array}(CH_2)_{\overline{n}}\right)\!-}\end{array}$$

wherein m, n, —A—, $\alpha$, and $\beta$ are as defined in claim 1.

4. A conjugated system-containing organic high molecular compound as claimed in claim 2, wherein the recurring unit is represented by the following structural formula:

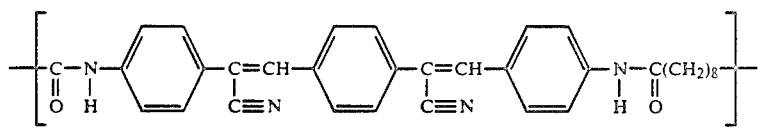

5. A conjugated system-containing organic high molecular compound as claimed in claim 3, wherein the recurring unit is represented by the following structural formula:

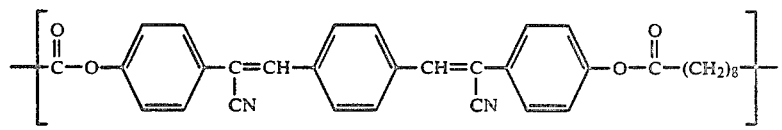

* * * * *